(12) United States Patent
Leonardo et al.

(10) Patent No.: US 7,443,903 B2
(45) Date of Patent: Oct. 28, 2008

(54) LASER APPARATUS HAVING MULTIPLE SYNCHRONOUS AMPLIFIERS TIED TO ONE MASTER OSCILLATOR

(75) Inventors: Manuel J. Leonardo, San Francisco, CA (US); Mark W. Byer, Mountain View, CA (US); Laura A. Smoliar, Los Altos, CA (US)

(73) Assignee: Mobius Photonics, Inc., Santa Clara, CA (US)

( * ) Notice: Subject to any disclaimer, the term of this patent is extended or adjusted under 35 U.S.C. 154(b) by 0 days.

(21) Appl. No.: 11/379,276

(22) Filed: Apr. 19, 2006

(65) Prior Publication Data

US 2007/0248136 A1  Oct. 25, 2007

(51) Int. Cl.
*H01S 3/082* (2006.01)

(52) U.S. Cl. .................................................. 372/97

(58) Field of Classification Search .................. None
See application file for complete search history.

(56) References Cited

U.S. PATENT DOCUMENTS

| | | | | |
|---|---|---|---|---|
| 4,794,605 | A * | 12/1988 | Aprahamian et al. | 372/97 |
| 5,694,408 | A | 12/1997 | Bott et al. | 372/6 |
| 5,745,284 | A | 4/1998 | Goldberg et al. | 359/344 |
| 6,151,338 | A | 11/2000 | Grubb et al. | 372/6 |
| 6,215,580 | B1 | 4/2001 | Kouta | 359/328 |
| 6,281,471 | B1 | 8/2001 | Smart | 219/121.62 |
| 6,297,903 | B1 | 10/2001 | Grubb et al. | 359/341.3 |
| 6,335,941 | B1 | 1/2002 | Grubb et al. | 372/6 |
| 6,340,806 | B1 | 1/2002 | Smart et al. | 219/121.62 |
| 6,541,731 | B2 | 4/2003 | Mead et al. | 219/121.7 |
| 6,590,698 | B1 | 7/2003 | Ohtsuki et al. | 359/326 |
| 6,625,181 | B1 | 9/2003 | Oshemkov et al. | 372/9 |
| 6,678,288 | B2 | 1/2004 | Rice | 372/6 |
| 6,678,294 | B1 | 1/2004 | Komine et al. | 372/38.01 |
| 6,703,582 | B2 | 3/2004 | Smart et al. | 219/121.62 |
| 6,711,187 | B2 | 3/2004 | Tanner et al. | 372/30 |
| 6,727,458 | B2 | 4/2004 | Smart | 219/121.62 |
| 6,738,398 | B2 | 5/2004 | Hirata et al. | 372/32 |
| 6,849,824 | B2 | 2/2005 | Arai et al. | 219/121.7 |
| 6,917,631 | B2 | 7/2005 | Richardson et al. | 372/5 |
| 7,039,076 | B2 | 5/2006 | Kane et al. | 372/6 |
| 2002/0191654 | A1 * | 12/2002 | Klene et al. | 372/25 |
| 2005/0041702 | A1 * | 2/2005 | Fermann et al. | 372/25 |

OTHER PUBLICATIONS

P. G. Kazansky, et. al., "Blue-light generation by quasi-phase-matched frequency doubling in thermally poled optical fibers", *Optics Letters*, 20, pp. 843, 1995.

International Search Report and Written Opinion of the International Searching Authority mailed Feb. 14, 2008 for the International application No. PCT/US07/63720.

* cited by examiner

*Primary Examiner*—Minsun Harvey
*Assistant Examiner*—Sean Hagan
(74) *Attorney, Agent, or Firm*—Joshua D. Isenberg; JDI Patent

(57) ABSTRACT

Laser apparatus and methods involving multiple amplified outputs are disclosed. A laser apparatus may include a master oscillator, a beam splitter coupled to the master oscillator, and two or more output heads optically coupled to the beam splitter. The beam splitter divides a signal from the master oscillator into two or more sub-signals. Each output head receives one of the two or more sub-signals. Each output head includes coupling optics optically coupled to the beam splitter. An optical power amplifier is optically coupled between the beam splitter and the coupling optics. Optical outputs from the two or more output heads do not spatially overlap at a target. The master oscillator signal may be pulsed so that optical outputs of the output heads are pulsed and substantially synchronous with each other.

48 Claims, 7 Drawing Sheets

LASER APPARATUS HAVING MULTIPLE SYNCHRONOUS AMPLIFIERS TIED TO ONE MASTER OSCILLATOR

FIELD OF THE INVENTION

This invention generally relates to lasers and more particularly to laser systems with multiple output heads that produce synchronized outputs.

BACKGROUND OF THE INVENTION

High powered lasers have many applications in which an intense beam of coherent light is focused onto a substrate or other target. Many high-power laser systems utilize a master oscillator power amplifier (MOPA) architecture. In a MOPA laser system a laser signal from a seed laser, referred to as a master oscillator is fed into an optical amplifier which amplifies the power of the master signal. MOPA architecture allows precise pulsing of the amplified output. MOPA-based laser systems are often used in high power applications, such as laser micromachining.

In certain laser applications it is sometimes desirable to simultaneously apply laser light to multiple locations on the target or to simultaneously process multiple targets. For example, in laser micromachining it may be advantageous to drill small and precise holes in parallel at multiple locations in order to speed up processing. One possible way to provide multiple laser beams is to split the amplified output from a single MOPA laser source. However, splitting the amplified output reduces the available power for each process operation. This can be a significant problem when there exists a minimum (or an optimum) average power and/or peak power for a particular operation. To compensate for the reduced power due to splitting of the beam, the output power of the laser source may be correspondingly increased.

It is generally difficult to significantly scale the total system output power of a multiple output head laser system without making architectural changes. Typically, the application dictates the optimum pulse duration, maximum or optimum PRF (pulse repetition frequency), pulse energy, peak power, wavelength, etc. Generally, the total system output power scales with average power. However, increasing the average power implies that either the PRF or pulse energy must be increased, or both. If the application restricts the PRF, then some sort of "pulse-picking" means would be needed to direct some pulses to one workpiece and other pulses to another workpiece. This tends to be complicated, unreliable, and/or expensive. Often the laser system puts limits on the pulse energy. Also, many laser systems put constraints on the relationships between pulse energy and other pulse parameters. Hence, it can be difficult to arbitrarily increase the power of a laser system (frequency-converted or otherwise) without compromising some of the parameters that are essential to the application.

An alternative to splitting the output of one laser system is to use multiple complete laser systems. Unfortunately, this consumes additional space, is costly and introduces performance variations because it is unlikely that the two separate lasers have identical performance characteristics. Even if identical performance could be obtained, it is difficult to synchronize the outputs from multiple laser systems.

Thus, there is a need in the art, for a multiple output laser apparatus that overcomes the above disadvantages.

SUMMARY OF THE INVENTION

The disadvantages associated with the prior art are overcome by embodiments of the present invention directed to laser apparatus and methods involving multiple amplified outputs. A laser apparatus may include a master oscillator, a beam splitter coupled to the master oscillator, and two or more output heads optically coupled to the beam splitter. The beam splitter divides a signal from the master oscillator into two or more sub-signals. Each output head receives one of the two or more sub-signals. Each output head includes coupling optics optically coupled to the beam splitter. An optical power amplifier is optically coupled between the beam splitter and the coupling optics. The coupling optics are configured such that optical outputs from the two or more output heads do not spatially overlap at a target. The amplified outputs may optionally be wavelength converted. The output heads may be configured to couple the amplified outputs to one or more different locations on one or more targets. The master oscillator may include a modulator configured to pulse an optical output of the master oscillator, whereby optical outputs of the two or more output heads are pulsed and substantially synchronous with each other.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Figure 1A:
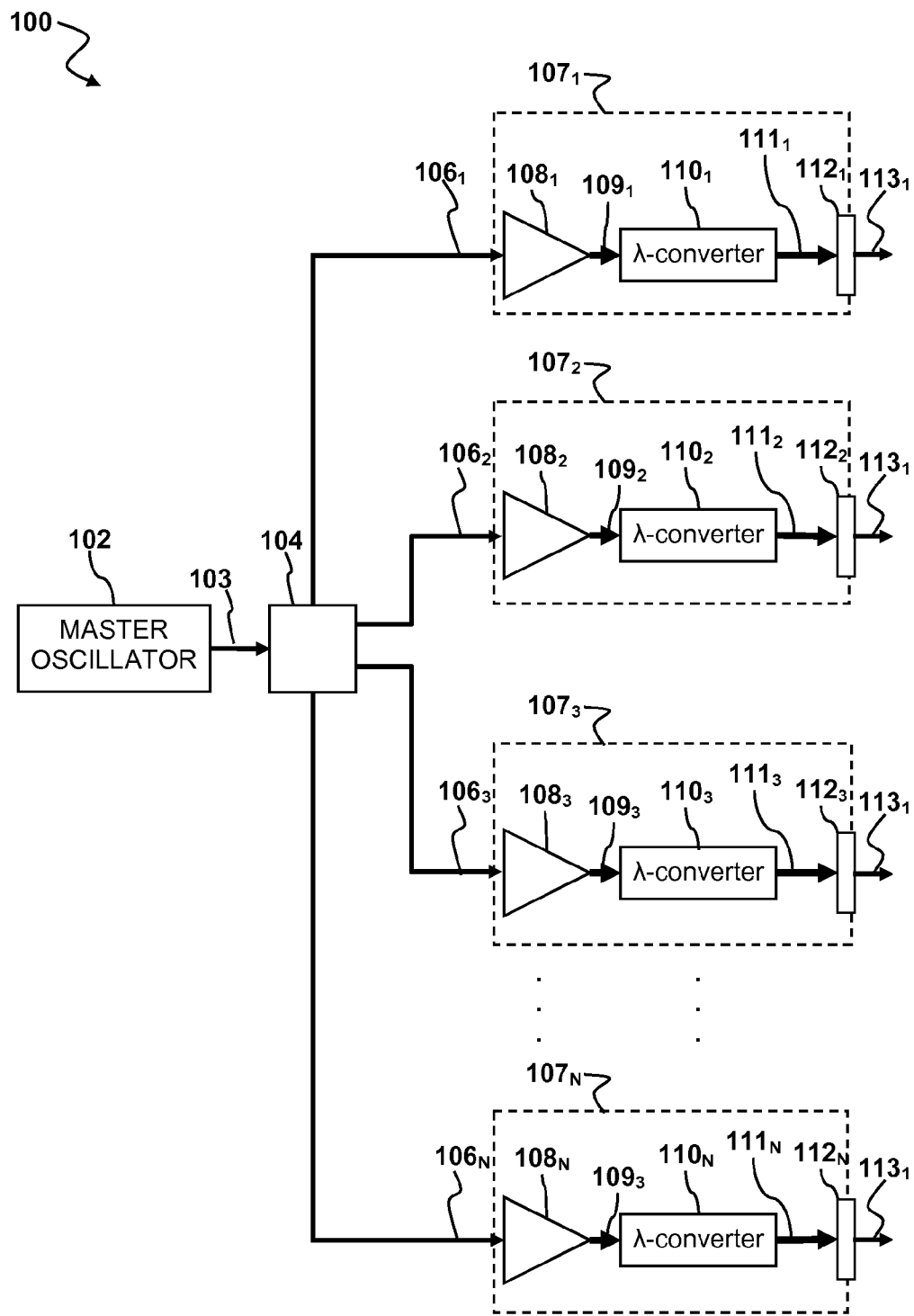
FIGS. 1A-1E are schematic diagrams of laser apparatus according to embodiments of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

GLOSSARY

As used herein:

The indefinite article "A" or "An" refers to a quantity of one or more of the item following the article, except where expressly stated otherwise.

Beam Splitter refers to an optical device capable of splitting a beam of light into two or more parts.

Cavity or Optically Resonant Cavity refers to an optical path defined by two or more reflecting surfaces along which light can reciprocate or circulate. Objects that intersect the optical path are said to be within the cavity.

Continuous wave (CW) laser: A laser that emits radiation continuously rather than in short bursts, as in a pulsed laser.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain Medium refers to a lasable material as described below with respect to Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Includes, including, e.g. "such as", "for example", etc., "and the like" may, can, could and other similar qualifiers used in conjunction with an item or list of items in a particular category means that the category contains the item or items listed but is not limited to those items.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that is contains a lasable material. This is any material—crystal, glass, liquid, semiconductor, dye or gas—the atoms of which are capable of being excited to a metastable state by pumping e.g., by light or an electric discharge. The light emitted by an atom as it drops back to the ground state and emits light by stimulated emission. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^9$ meters) to about 100 microns.

Mode-Locked Laser refers to a laser that functions by controlling the relative phase (sometimes through modulation with respect to time) of each mode internally to give rise selectively to energy bursts of high peak power and short duration, e.g., in the picosecond ($10^{-12}$ second) domain.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like. Optical fiber can also be induced to have a non-linear response to optical radiation by fabricating microstructures in the fiber.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Q refers to the figure of merit of a resonator (cavity), defined as $(2\pi)\times$(average energy stored in the resonator)/(energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

DESCRIPTION

FIG. 1A illustrates a multiple output frequency-converted laser apparatus 100 and method according to an embodiment of the present invention. Specifically, the apparatus 100 generally includes a master oscillator 102, a beam splitter 104 and multiple parallel wavelength-converting optical output heads $107_1$, $107_2$, $107_3$, ... $107_N$ including optical power amplifiers $108_1$, $108_2$, $108_3$ ... $108_N$ optically coupled to corresponding (optional) wavelength converters $110_1$, $110_2$, $110_3$ ... $110_N$ and coupling optics $112_1$, $112_2$, $112_3$ ... $112_N$. Each output head $107_1$ ... $107_N$ may be in the form of a separate modular unit that is remotely located from the master oscillator 102.

A method for producing multiple optical wavelength-converted outputs may be appreciated from the following discussion of the operation of the apparatus 100. The master oscillator 102 generates a master optical signal 103. Generally, master oscillator 102 may include a laser and the master optical signal 103 may be in the form of coherent light. The beam splitter 104 splits the master optical signal 103 into sub-signals $106_1$, $106_2$, $106_3$ ... $106_N$. The beam splitter 104 may be any suitable device for splitting the master optical signal into the sub-signals. Beam splitters can based on either guided-wave or free-space optical transmission. Examples of guided-wave beam splitters include polarization maintaining (PM) fiber couplers, integrated optic couplers, and fused tapered couplers. Examples of fiber couplers that may be used as the beam splitter 104 are available from Canadian Instrumentation & Research Ltd. and are described, e.g., at http://www.cirl.com. Examples of free-space beam splitters include partially reflective dielectric mirrors, polarizing beam splitters such as Wollaston prisms, half-silvered mirrors, dichroic mirrors and dichroic mirrored prisms.

The sub signals $106_1$ ... $106_N$ are directed along separate parallel optical paths. The separate optical paths may be free space paths or may be paths defined by separate optical fibers or waveguides. The optical amplifiers $108_1$ ... $108_N$ correspondingly amplify the sub-signals $106_1$ ... $106_N$ thereby producing amplified output signals $109_1$ ... $109_N$. Depending on whether or not wavelength conversion is used, the system 100 may produce amplified outputs characterized by vacuum wavelengths in the infrared (IR) visible or ultraviolet (UV) ranges of the electromagnetic spectrum. As used herein, the expression "amplified output" generally refers to any amplified signal generated from one or more of the sub-signals $106_1$ ... $106_N$ and generally encompasses the amplified output signals $109_1$ ... $109_N$ and any optical signals derived therefrom.

For example, the amplified output signals $109_1$, $109_2$, $109_3$ ... $109_N$ may be correspondingly converted in vacuum wavelength by the optical wavelength converters $110_1$, $110_2$, $110_3$ ... $110_N$ to produce corresponding wavelength-converted outputs $111_1$, $111_2$, $111_3$ ... $111_N$. The wavelength-converted outputs $111_1$ ... $111_N$ are generally characterized by vacuum wavelengths that are different from the vacuum wavelength of the master oscillator signal 103 and sub-signals $106_1$ ... $106_N$. The optical wavelength converters may produce the wavelength-converted outputs $111_1$ ... $111_N$ from the amplified outputs $109_1$ ... $109_N$ by one or more non-linear optical wavelength conversion processes. Examples of such process include, but are not limited to, e.g., second-, third-, and fourth-harmonic generation, optical parametric oscillation, sum frequency generation, difference frequency generation, optical parametric amplification, optical parametric oscillation and the stimulated Raman effect. Such processes may be implemented using non-linear optical materials that are phase matched to produce the desired wavelength conversion effect. The output heads $107_1$ ... $107_N$ may have wavelength converters $110_1$ ... $110_N$ configured to produce wavelength-converted outputs $111_1$ ... $111_N$ characterized by different vacuum wavelengths. It is noted that although optical amplifiers $108_1$ ... $108_N$ and wavelength converters $110_1$ ... $110_N$ are shown as separate components, the amplification and wavelength conversion functions may alternatively be implemented in a single component, such as a non-linear amplifier fiber.

The coupling optics $112_1$, $112_2$, $112_3$ ... $112_N$ receive the wavelength-converted outputs $111_1$ ... $111_N$ and transmit final outputs $113_1$, $113_2$, $113_3$ ... $113_N$ to a target. The output heads $107_1$ ... $107_N$ may be configured so that the final outputs $113_1$ ... $113_N$ do not spatially overlap at the target. This allows processing multiple targets or different points or sides on the same target with amplified and wavelength-converted radiation. The coupling optics $112_1$ ... $112_N$ may be in the form of simple windows or may include lenses having focal lengths and positions selected to collimate or focus the amplified outputs $109_1$ ... $109_N$ or the wavelength-converted outputs $111_1$ ... $111_N$ as final outputs $113_1$ ... $113_N$ onto one or more targets. All output heads $107_1$ ... $107_N$ need not have identical coupling optics $112_1$ ... $112_N$.

The coupling optics $112_1$ ... $112_N$ may alternatively be configured to modify the temporal characteristics of final outputs $113_1$ ... $113_N$. In some embodiments, the coupling optics $112_1$ ... $112_N$ may include saturable Bragg absorbers to change a CW beam into some form of pulsed beam. Alternatively, the coupling optics $112_1$ ... $112_N$ may include pulse-compression (or stretcher) schemes. This type of coupling optic $112_1$ ... $112_N$ may be particularly useful with picosecond or femtosecond type pulsed outputs to avoid optical non-linearities just prior to beam delivery. Alternatively, the coupling optics $112_1$ ... $112_N$ may include some means to affect the temporal characteristics, e.g., a pulse repetition frequency (PRF), of the final outputs $113_1$ ... $113_N$. For example, the coupling optics $112_1$ ... $112_N$ may include optical shutters that allow a user to selectively block all or some of outputs $113_1$ ... $113_N$. Alternatively, the coupling optics $112_1$ ... $112_N$ may include pulse pickers to reduce the PRF of the final outputs $113_1$ ... $113_N$. This would allow a user to selectively control which of amplified outputs $109_1$ ... $109_N$ or the wavelength-converted outputs $111_1$ ... $111_N$ are delivered to a target as final outputs $113_1$ ... $113_N$.

The final output beams $113_1 \ldots 113_N$ may be delivered to any of a number of different types of targets to implement any of a number of different types of processes depending on the application. Applications include, but are not limited to, material processing, medical treatments, laser particle accelerators, and wafer inspection. Examples of suitable targets include, but are not limited to, metals, ceramics, semiconductors, polymers, composites, thin films, organic materials, in vitro or in vivo biological samples, elementary particles. In the particular case of material processing, targets may include, e.g., wires, printed circuit (PC) boards, integrated circuit (IC) packages, semiconductor wafers and dies, LED wafers, LED packages, LED dies and the like. Examples of material processing applications include surface texturing, heat treatment, surface engraving, fine micro-machining, surface ablation, cutting, grooving, bump forming, coating, soldering, brazing, sintering, sealing, welding link blowing, wafer scribing, dicing and marking, via drilling, memory repair, flat panel display repair, stereolithography, maskless lithography, surface diffusion and surface conversion to a compound.

An advantage of the apparatus 100 is that if the master oscillator 102 produces a pulsed output as the master signal 103 the sub-signals $106_1 \ldots 106_N$ are also pulsed and can be substantially synchronous with each other as they reach their respective power amplifiers $108_1 \ldots 108_N$. As used herein substantially synchronous means that the sub-signals $106_1 \ldots 106_N$ have substantially the same pulse width and have a high degree of overlap in time with respect to each other. The amount of overlap can be adjusted, e.g., by compensating for differences in optical path differences between the beam splitter 104 and the power amplifiers $108_1 \ldots 108_N$. Similarly, the wavelength-converted outputs $111_1 \ldots 111_N$ may be substantially synchronous with each other. Synchronicity between the different outputs $111_1 \ldots 111^N$ may be adjusted, e.g., by adjusting optical path lengths between the beam splitter 104 and the output heads $107_1 \ldots 107_N$.

By "synchronous" it is meant that modulation of the radiation from the master oscillator 102 provides a common modulation of outputs (wavelength-converted or otherwise) of the output heads $107_1 \ldots 107_N$. Such synchronous outputs are particularly advantageous in material processing applications. A machine with N laser output heads that can process N identical targets in parallel or one that processes N different locations on the same or different targets has N times the throughput of a single-headed machine. This capability is particularly significant for manufacturing environments, where identical products are produced to exacting quality standards. Furthermore, if all the outputs are identically timed, the dwell time at any processing step is minimized. For every nanosecond of slop between different output heads a nanosecond more dwell time is required at that step in the process. Over millions of process points, such delays can add up to a significant burden on throughput. If, instead, the outputs can be synchronized such delays can be drastically reduced and throughput may be greatly enhanced. Providing such synchronous outputs, sometimes referred to as "jitter-free" multiplexing, is particularly useful for laser apparatus used in industrial materials processing applications, such as those described above.

In addition, the use of multiple amplifiers in conjunction with the output heads $107_1 \ldots 107_N$ provides a tremendous advantage in power scaling of the apparatus. Specifically, an effective system peak power, i.e., the peak power of the output (wavelength converted or otherwise) of a single output head multiplied by the number of heads may be larger than a peak power which would cause damage, fiber non-linearity problems or undesirable distortion of the amplified output. Preferably, the effective peak power is less than a threshold for fiber non-linearity. Furthermore, it is desirable for the effective peak power of each output head to be large enough that wavelength conversion efficiency is sufficiently high, e.g., greater than about 20% for SHG or THG processes. By contrast, dividing the output of a high power laser to achieve the same result would restrict pulse properties, which are vital to the materials processing applications. The use of multiple amplified outputs allows pulse repetition frequency and/or pulse width of the amplified outputs to be optimized for different applications, such as materials processing applications.

Furthermore, embodiments of the invention also allow power scaling to large total system output powers. As used herein, total system output power refers to the total average output power of all the output heads $107_1 \ldots 107_N$ added together. In embodiments of the present invention, the total system output power of the apparatus 100 may be about 10 watts or more.

Generally, each output head $107_1 \ldots 107_N$ operates best within a range of parameters. In the particular case of the wavelength converted laser, this means that a range of peak powers for beams $109_1 \ldots 109_N$ are required to get efficient operation. If the peak power is too low there may be insufficient conversion in the wavelength converters $110_1 \ldots 110_N$. If the peak power is too high there may be parasitic effects in the fiber (i.e. Raman scattering, Brillouin scattering, self phase modulation) that can reduce the wavelength-converted output power. Since, the peak power is thus constrained, and since the PRF and pulse width have already been selected for the application requirements, it would otherwise be difficult to scale average power in a wavelength-converted laser system. The Average Power output of each output head equals Peak Power multiplied by Pulse Width multiplied by PRF (multiplied by a constant that accounts for pulse shape) Because there are multiple heads, there can be a higher average power.

Figure 1B:
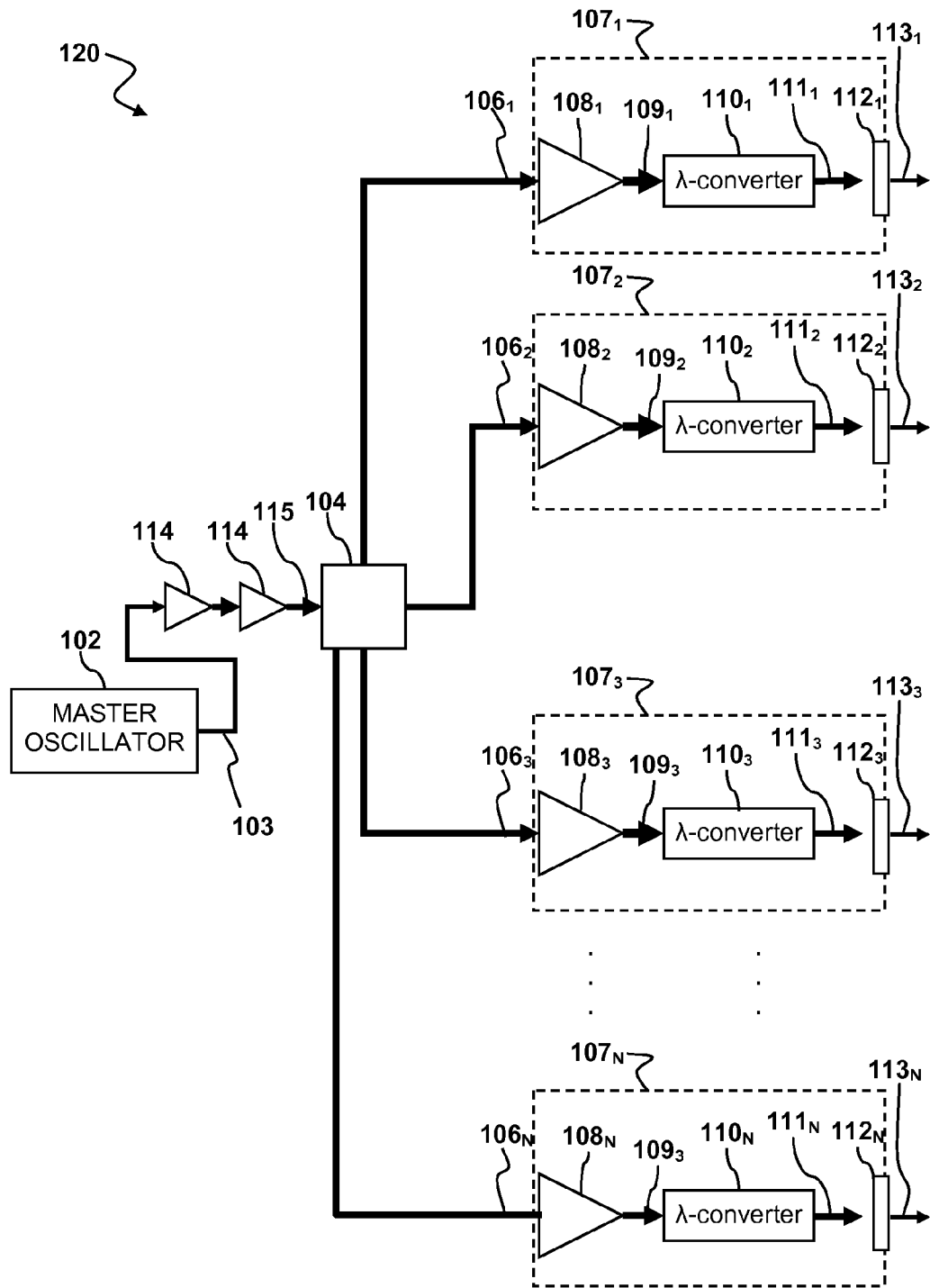

In certain embodiments of the invention a pre-amplification stage may be included between generation of the master signal 103 and amplification by the optical power amplifiers $108_1 \ldots 108_N$. For example, as shown in FIG. 1B, an alternative apparatus 120 may include a pre-amplifier 114 (or two or more pre-amplifiers 114 in series) optically coupled between the master oscillator 102 and the beam splitter 104. The pre-amplifiers 114 need not be identical. The pre-amplifiers 114 amplify the master signal 103 to form a pre-amplified signal 115, which the beam splitter splits it into the sub-signals $106_1 \ldots 106_N$. Optical power amplification and wavelength conversion of the sub-signals $106_1 \ldots 106_N$ may then proceed as described above with respect to FIG. 1A. In the case of two preamplifiers 114 in series, the two preamplifiers need not be identical (although they can be). Alternatively the two or more preamplifiers 114 in series in FIG. 1B could be replaced with a single preamplifier 114.

Figure 1C:
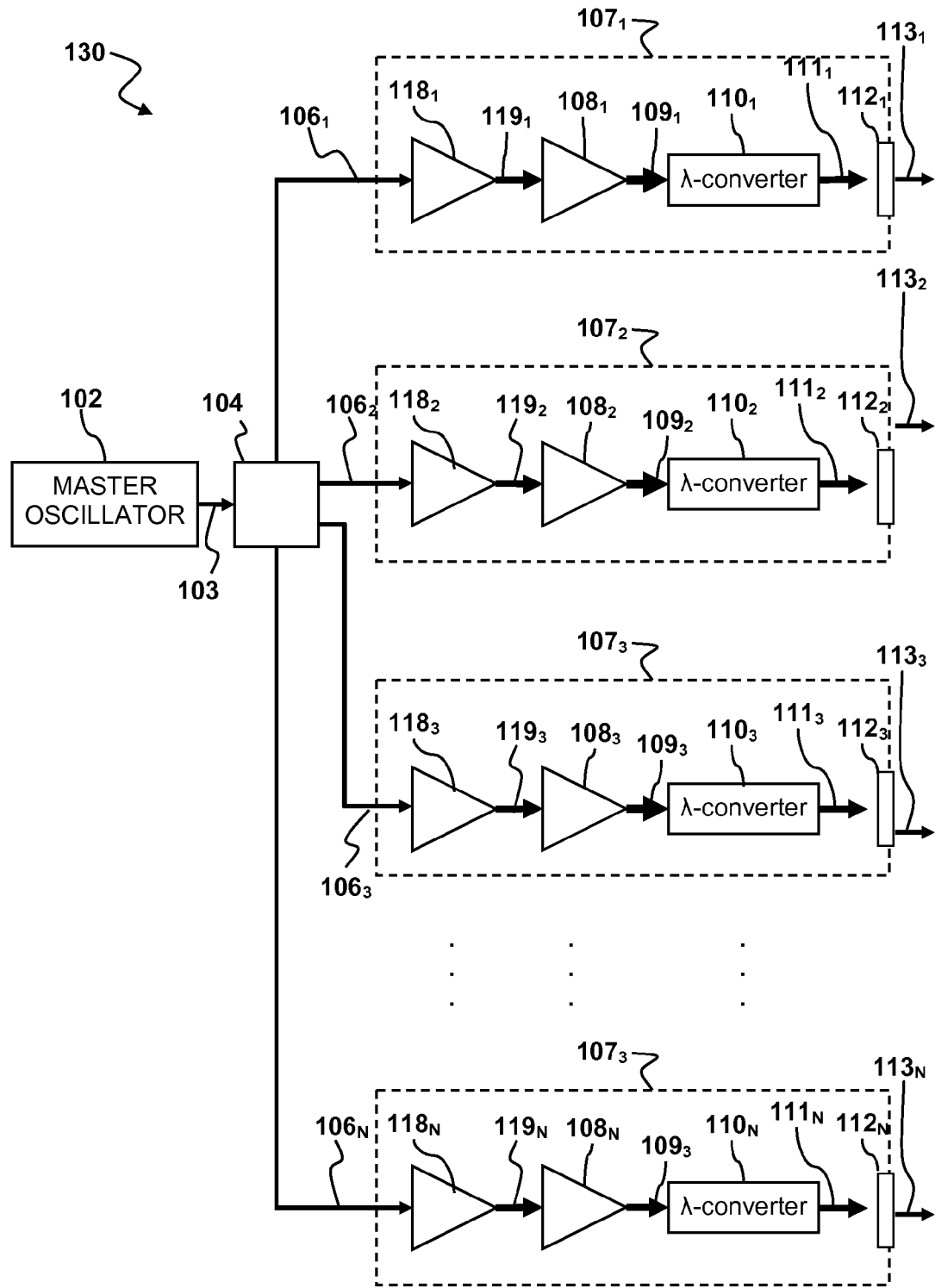

Alternatively, the pre-amplification stage may take place after splitting the master signal 103 into the sub-signals $106_1, \ldots 106_N$ and before amplification by the optical power amplifiers $108_1, \ldots 108_N$. For example, as illustrated in FIG. 1C, in another alternative apparatus 130 the output heads $107_1, 107_2, 107_3, \ldots 107_N$ may respectively include optical pre-amplifiers $118_1, \ldots 118_N$ optically coupled between the optical power amplifiers $108_1, \ldots 108_N$ and the beam splitter 104. The optical pre-amplifiers $118_1, \ldots 118_N$ correspondingly pre-amplify the sub-signals $106_1, \ldots 106_N$ to produce pre-amplified sub-signals $119_1, 119_2, 119_3 \ldots 119_N$, which are respectively amplified by the power amplifiers optical pre-amplifiers $108_1, \ldots 108_N$. Optional wavelength conversion of the resulting amplified output signals $109_1, \ldots 109_N$ may proceed as described above with respect to FIG. 1A.

Figure 1D:
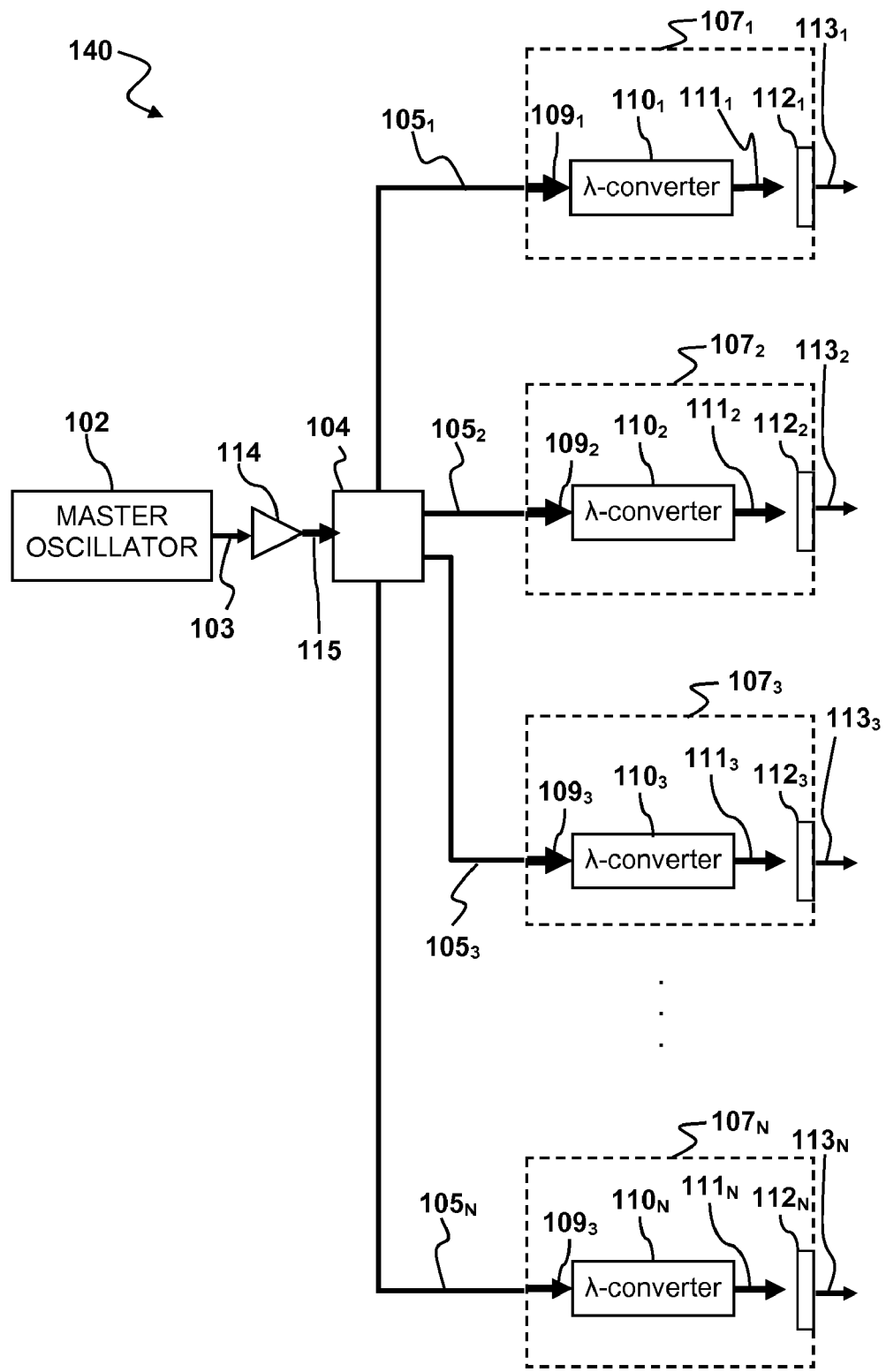

In another alternative apparatus 140 shown in FIG. 1D the output heads $107_1 \ldots 107_N$ may be implemented with wavelength converters $110_1 \ldots 110_N$ but not optical amplifiers or pre-amplifiers. Instead, the output heads $107_1 \ldots 107_N$ may include amplifier fibers $105_1 \ldots 105_N$ coupled to the beam splitter 104 that transmit and amplify the sub-signals from the master oscillator 102 to produce amplified output signals $109_1 \ldots 109_N$ that are input to the wavelength converters $110_1 \ldots 110_N$. An optional pre-amplifier 114 may be coupled between the master oscillator 102 and the beam splitter 104. Such a configuration is advantageous in that it allows for very light and compact output heads $107_1 \ldots 107_N$. The apparatus 140 can be useful in applications where the positioning and/or movement of the output heads is within a range that is compatible with limitations on the bend radius of the amplifier fibers $105_1 \ldots 105_N$. In alternative embodiments, the amplifier fibers $105_1 \ldots 105_N$ may be located at a controller proximate to the master oscillator 102. Special passive optical fiber may be used to deliver the amplified outputs $109_1 \ldots 109_N$ to the wavelength converters $110_1 \ldots 110_N$.

Figure 1E:
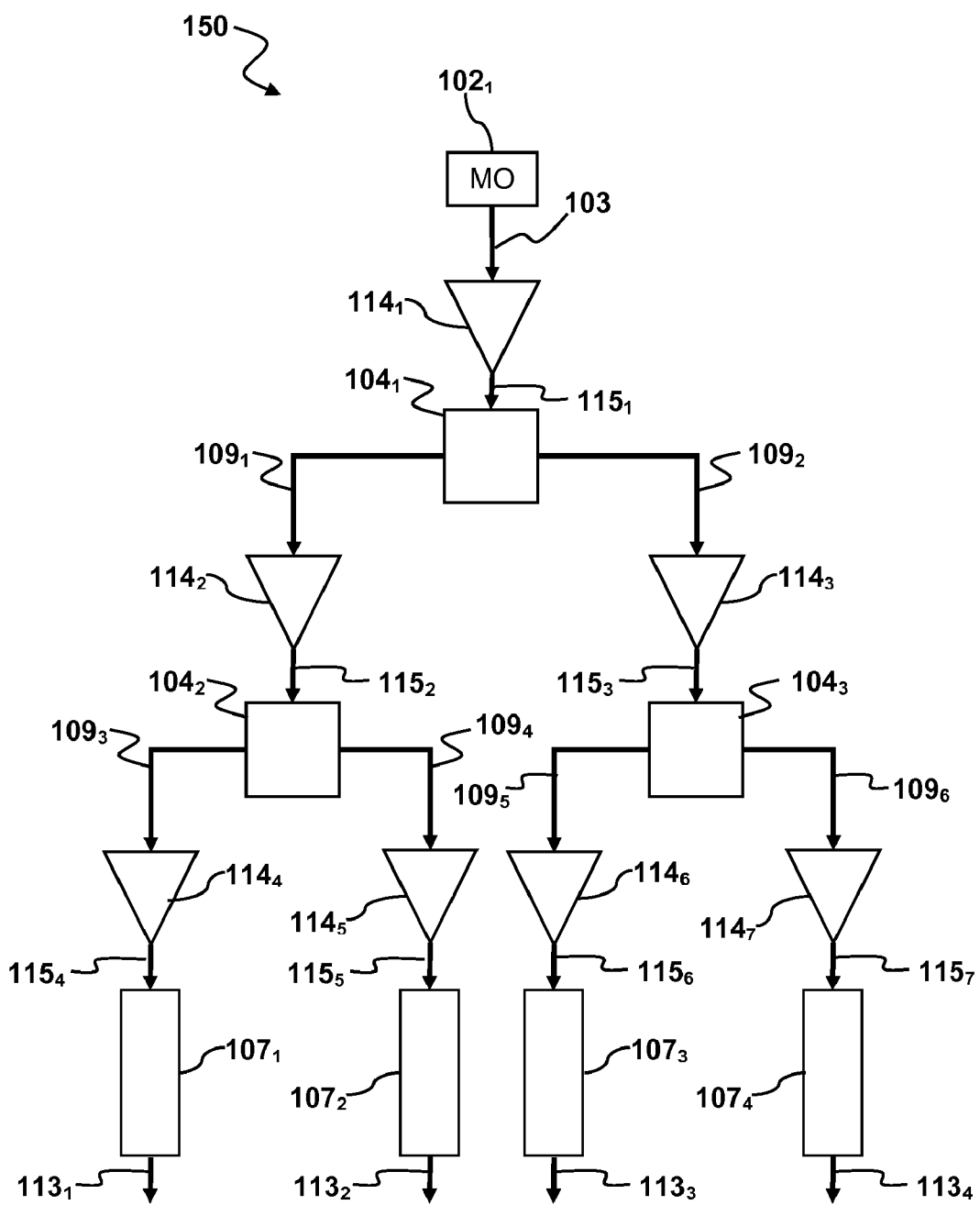

In another alternative apparatus 150 shown in FIG. 1E, beam splitting and pre-amplification stages may be cascaded in a branching network, with a pre-amplifier coupled to the input and each output of a beam splitter. In the apparatus 150 a master oscillator 102 is optically coupled to a pre-amplifier $114_1$ which produces an amplified output $115_1$ that is coupled to a first beam splitter $104_1$. First and second portions $109_1$, $109_2$ of the amplified output $115_1$ are respectively coupled to second and third pre-amplifiers $114_2, 114_3$. Amplified outputs $115_2, 115_3$ from the second and third pre-amplifiers $114_2, 114_3$ are respectively coupled to second and third beam splitters $104_2, 104_3$. The second and third beam splitters $104_2, 104_3$ respectively split the second and third amplified outputs $115_2, 115_3$ into portions $109_3, 109_4, 109_5, 109_6$, which are respectively coupled to pre-amplifiers $114_4, 114_5, 114_6, 114_7$. Amplified outputs $115_4, 115_5, 115_6, 115_7$ from the pre-amplifiers $114_4, 114_5, 114_6, 114_7$ are coupled to output heads $107_1, 107_2, 107_3, 107_4$, which produce output signals pre-amplifiers $113_1, 113_2, 113_3, 113_4$. The output heads $107_1, 107_2, 107_3, 107_4$ may include power amplifiers, wavelength converters and coupling optics, e.g., as described above.

Figure 2:
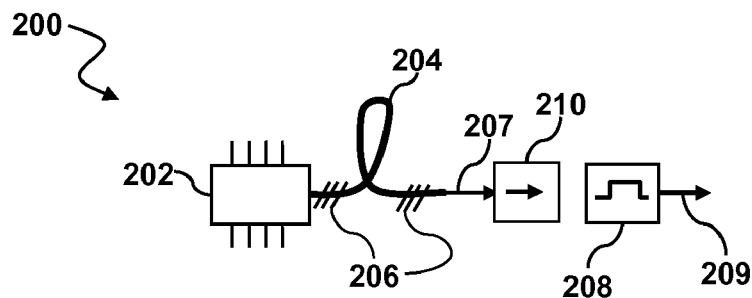
FIG. 2 is a schematic diagram of a master oscillator suitable for use with embodiments of the present invention.

There are a number of different possible designs for the master oscillator 102. In general, the master oscillator 102 may be a laser or a narrow band amplified spontaneous emission (ASE) source. The master optical signal 103 may be characterized by a vacuum wavelength in a range from about 500 nm to about 2000 nm. Optical signals having wavelengths within this range may be obtained with a variety of different lasers, such as semiconductor lasers and fiber lasers. By way of example, one possible laser design, among others is a fiber laser. FIG. 2 depicts an example of a fiber laser 200 that may be used as the master oscillator 102 of FIGS. 1A-1E. The fiber laser 200 generally includes a pumping source 202 optically coupled to a fiber having a core that is doped with a suitable dopant. By way of example, and without loss of generality, the pumping source may be a diode laser. Examples of suitable diode lasers include distributed feedback (DFB), distributed Bragg reflector (DBR), Fabry-Perot laser diode or a narrow band amplified spontaneous emission (ASE) source. An example of a suitable pump laser diode is a Series 2900, 980 nm pump diode available from JDS Uniphase of Milpitas, Calif.

Pumping radiation from the pumping source 202 is coupled to the core of the fiber 204. The pumping radiation interacts with dopant atoms in the fiber core stimulating emission of radiation. Reflectors 206, e.g., Bragg gratings, at opposite ends of the fiber 204 reflect the stimulated radiation back and forth through the fiber 204, stimulating additional emission with each pass through the fiber 204. Some of the stimulated radiation 207 leaks out of the reflector 206 at one end as output. An optical modulator 208 may pulse the stimulated radiation to produce a pulsed output 209. By way of example, the optical modulator 208 may include an acousto-optic, magneto optic or electro-optic modulator. An optical isolator 210 may be optically coupled between the fiber 204 and the modulator 208 to prevent radiation from undesirably entering the fiber 204 from its output end.

The vacuum wavelength of the stimulated radiation 207 is dependent on the choice of dopant and fiber material. Different dopant and fiber materials require different vacuum wavelengths of pumping radiation. By way of example a glass fiber doped with ytterbium (Yb) produces stimulated emission at a vacuum wavelength of about 1.03 to about 1.12 microns when pumped with radiation having a vacuum wavelength of about 976 nanometers.

Alternatively, the master oscillator 102 may be a diode-pumped solid state (DPSS) laser, which may be passively Q-switched or run continuous wave (CW). An example of a passive Q-switched micro laser is a Microchip micro laser available from Teem Photonics of Wellesley, Mass. An example of a suitable CW DPSS laser is a model 125 non-planar ring oscillator (NPRO) laser available from JDS Uniphase of Milpitas, Calif. Alternatively, the master oscillator 102 may be a distributed Bragg reflector (DBR) laser. An example of a commercially available DBR is a model DBR-1063-100 from Sacher Lasertechnik Group of Marburg, Germany. This particular distributed Bragg reflector laser diode produces emission at a vacuum wavelength of 1063 nm with 100 mW output power. Another example of a commercially available device that may be used as the master oscillator 102 is an ASE Narrowband Source, available from Multiwave Photonics, S.A., of Moreira de Maia, Portugal. The output of any CW source, such as a DPSS, DBR laser diode, or ASE source, may be modulated using an external optical modulator In alternative embodiments of the invention the master oscillator could take one of many forms. The pulse format may be any suitable pulse format, with pulse durations ranging e.g., from continuous-wave (CW) to nanosecond pulses to pico/femtosecond pulses. The pulses may be repeated at any repetition rate suitable for the pulse duration. The pulse format may include intermittent bursts of pulses. The output of the power amplifiers need not be frequency-converted, i.e., the wavelength converters $110_1, 110_2, 110_3 \ldots 110_N$ may be omitted without departing from the scope of the present invention. The output wavelength could be IR, visible, UV.

Figure 3:
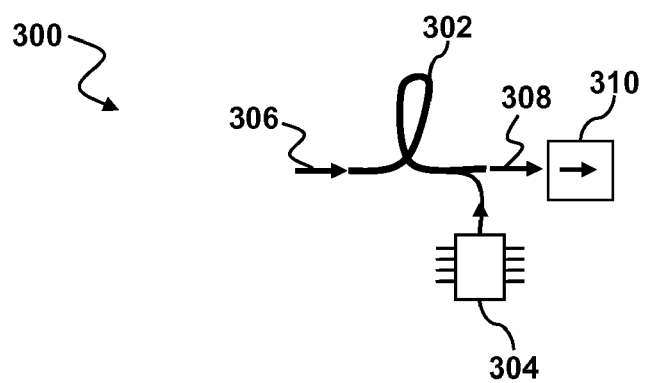
FIG. 3 is a schematic diagram of a fiber amplifier suitable for use as a pre-amplifier in embodiments of the present invention.

A number of different designs may be used for the optical power amplifiers $108_1 \ldots 108_N$, pre-amplifiers 114, 118 and amplifier fibers $105_1 \ldots 105_N$. By way of example and without loss of generality the power amplifiers $108_1 \ldots 108_N$ and/or pre-amplifiers 114, 118 may be fiber amplifiers. FIG. 3 depicts an example of a fiber pre-amplifier 300 having an optical fiber 302 and a pumping source 304. The optical fiber 302 includes cladding and a doped core. The core of the fiber 302 may be, e.g., about 6 microns in diameter. Input radiation 306 that is to be amplified is coupled to the core. Pumping radiation from the pumping source 304 is also typically coupled to the core, but may alternatively be coupled to the cladding. By way of example, the input radiation 306 may originate from a master oscillator. Dopant atoms, e.g., rare earth elements such as ytterbium (Yb), erbium (Er), neodymium (Nd), holmium (Ho) samarium (Sm) and thulium (Tm), or combinations of two or more of these, in the core of the fiber 302 absorb energy from the pumping radiation. Those of skill in the art will be familiar with rare-earth-doped fiber amplifiers (REDFA) schemes and architectures.

The input radiation 306 stimulates emission of radiation from the dopant atoms. The stimulated radiation has the same frequency and phase as the input radiation. The result is an amplified output 308 having the same frequency and phase as the input radiation but a greater optical intensity. An optical isolator 310 may be optically coupled to an output end of the fiber 302 to prevent radiation from undesirably entering the fiber 302 from its output end, e.g., as a result of reflection. In alternative embodiments of the invention, the pre-amplifier may be omitted included or upgraded as required to achieve the appropriate optical power required for the number of output heads in use.

Figure 4:
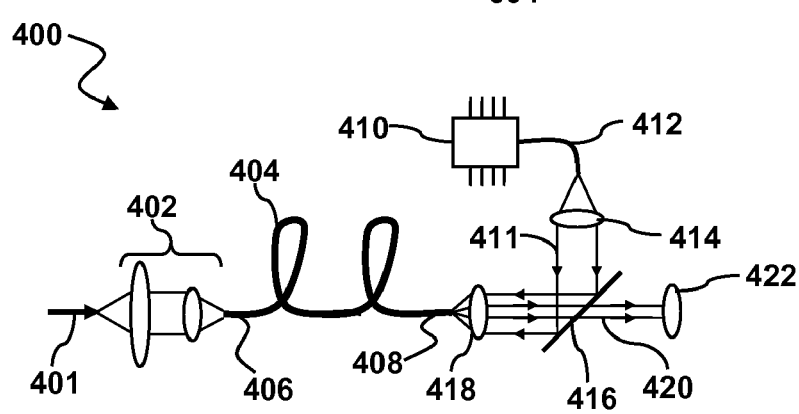
FIG. 4 is a schematic diagram of a fiber amplifier suitable for use as a power amplifier in embodiments of the present invention.

FIG. 4 depicts one possible example, among others, of a fiber power amplifier 400 that may be used in apparatus of the types depicted in FIGS. 1A-1C. The fiber power amplifier 400 generally receives an optical signal 401 that is to be amplified. The optical signal 401 may originate from a master oscillator and may be pre-amplified between the master oscillator and the fiber power amplifier 400. An optical coupler 402, e.g., having a pair of relay lenses, may couple the optical signal 401 into an optical fiber 404 at a first end 406. Preferably, the fiber 404 is long enough that it absorbs a sufficient percentage of the pumping radiation (e.g., about 90% or more). It is desirable for the fiber 404 to have a core diameter suitable for a large mode area (LMA) fiber. It is further desirable that fiber 404 be dual clad, with an inner cladding diameter and acceptance angle suitable for accepting high-power, multi-mode pump radiation. By way of example, the fiber 404 may be a Nufern Dual Clad Active fiber with LMA core, e.g., part numbers LMA-EYDF-25/300 or LMA-TDF-25/250 available from Nufern of East Granby, Conn. or Model DC-200-41-PZ-Yb available from Crystal Fibre A/S of Birkerød, Denmark. By way of example, the core of the fiber 404 may be doped with a rare earth element, such as erbium (Er), ytterbium (Yb) or neodymium (Nd).

A pumping source 410 supplies pumping radiation 411 to the fiber 404 at a second end 408. The pumping source 410 typically contains one or more high power laser diodes. These laser diodes can be either in the form of a single-emitter or a monolithic bar, containing multiple single emitters. Specific examples of suitable commercially available laser diodes include a model LIMO110-F400-DL980 laser diode, from Lissotschenko Mikrooptik (LIMO) GmBH of Dortmund, Germany and an Apollo F400-980-4 laser diode from Apollo Instruments of Irvine, Calif. Alternatively, the pumping source 410 may be an array of single emitters optically coupled together, for example a model L3 980 nm pump package available from JDS Uniphase of Milpitas, Calif.

Preferably, the source 410 is a multimode source and the fiber 404 has a multi-mode inner cladding. In the power amplifier 400, the pumping radiation is typically coupled to the inner cladding of the fiber 404. If the pumping radiation 411 is single-mode, then the pumping radiation 411 may alternatively be coupled directly to the core of the fiber 404. By way of example, a fiber 412 may couple the pumping radiation 411 from the pumping source 410 to a collimator lens 414. The pumping radiation 411 may be coupled to either end of the fiber 404 or to both ends. In some embodiments it is advantageous to situate the pumping source 410 proximal to the master oscillator, and connect the pumping source 410 to an output head via fiber 412, which may be a multi-mode fiber. Such an arrangement reduces the size and the heat load in the output head.

The pumping radiation 411 emerges from the fiber 412 as a divergent beam. The collimator lens 414 focuses the divergent beam into a collimated beam. A wavelength-selective reflector 416 (e.g., a dichroic filter) reflects the pumping radiation toward a converging lens 418, which focuses the collimated pumping radiation into the second end 408 of the fiber 404. Dopant atoms in the core of the fiber 404 absorb the pumping radiation 411 stimulating emission of amplified output radiation 420 having the same frequency and phase as the optical signal 401 but with an amplified optical intensity. Amplified output radiation 420 diverges as it emerges from the second end 408 of the fiber 404. The wavelength-selective reflector 416 is configured to transmit the amplified output radiation 420. By way of example, the frequency selective filter 416 may be a dichroic filter having a stop band selected to reflect radiation in the frequency range of the pumping radiation 411 (e.g., about 976 nanometers) and a passband selected to transmit radiation in the frequency range of the amplified output radiation 420 (e.g., about 1.05 microns). The amplified output radiation 420 may then be focused by an output coupler lens 422.

Although the preceding discussion details fiber amplifiers that may be used as pre-amplifiers or power amplifiers, other optical amplifier designs may be used. As an alternative to fiber implementations, the amplifier 400 may use a slab-type gain medium, e.g., a doped crystal such as neodymium-doped yttrium orthovanadate ($Nd:YVO_4$), neodymium-doped yttrium aluminum garnet (Nd:YAG), or a ceramic gain medium such as sintered Nd:YAG or a semiconductor-based gain medium. Such slab-type gain media may be side-pumped or end-pumped. Gain media with rod-type configurations may also be used in the amplifier 400.

Figure 5:
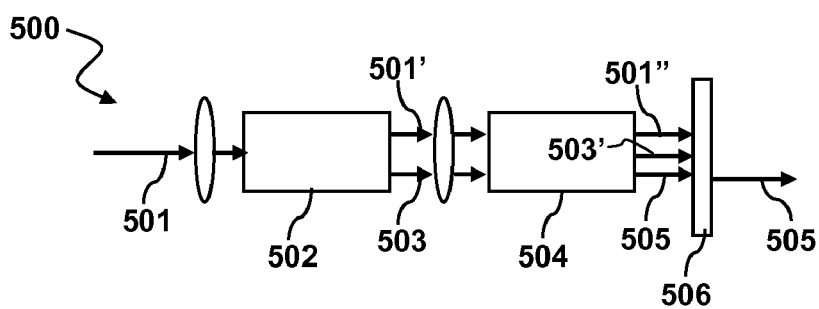
FIG. 5 is a schematic diagram of a third harmonic generator suitable for use as a wavelength converter in embodiments of the present invention.

FIG. 5 depicts one example, among others, of a wavelength converter 500 that may be used with apparatus of the type depicted in FIGS. 1A-1E. In this example, the wavelength converter 500 is a third-harmonic generator. The wavelength converter 500 generally includes first and second non-linear crystals 502, 504. Examples of suitable non-linear crystals of lithium Niobate ($LiNbO_3$), lithium triborate (LBO), beta-barium borate (BBO), cesium lithium borate (CLBO), lithium tantalite, stoichiometric lithium tantalite (SLT) potassium titanyl phosphate ($KTiOPO_4$ also known as KTP), ADA, ADP, CBO, DADA, DADP, DKDP, DLAP, DRDP, KABO, KDA, KDP, LB4, or LFM and isomorphs thereof, periodically poled materials such as periodically poled lithium Niobate (PPLN), periodically poled lithium tantalite and periodically poled stoichiometric lithium tantalite (PPSLT). Such non-linear materials are available commercially, e.g., from Fujian Castech Crystals of Fujian, China. In addition, nonlinear fiber may be used for wavelength conversion, e.g., as described above with respect to FIG. 1E.

The first non-linear crystal 502 receives amplified input radiation 501 from a power amplifier. The input radiation 501 is characterized by an optical frequency $\omega$. The first non-linear crystal 502 is phase-matched for second harmonic generation. Phase-matching may be controlled by adjusting a temperature of the first non-linear crystal. Specifically, a portion of the input radiation 501 reacts in the non-linear crystal 502 to produce second-harmonic radiation 503, which is characterized by an optical frequency $2\omega$. The second harmonic radiation 502 and a remaining portion 501' of the input radiation 501 couple to the second non-linear crystal 504. The second non-linear crystal 504 is phase-matched for sum frequency generation between radiation of optical frequency $2\omega$ and radiation of optical frequency ω. Specifically, in the second non-linear crystal 504, the second harmonic radiation 503 and the remaining portion 501' of the input radiation 501 interact in the second non-linear crystal 504 to produce third-harmonic radiation 505 characterized by optical frequency 3ω. The third harmonic radiation 505 exits the second non-linear crystal 504 to provide the frequency-converted output.

If the conversion efficiency of the second non-linear crystal is less than 100% some left-over portion 501" of the input radiation 501 may also exit the second non-linear crystal 504. The wavelength converter 500 may include an optical filter 506 (e.g., a dichroic filter) that reflects the left-over portion 501" and a left-over portion 503' of the second-harmonic radiation 503 while transmitting the third harmonic radiation 505. The left-over portions 501', 503' may be directed to an optical trap or otherwise disposed of as waste light. Alternatively optical filter 506 can be configured to selectively pass more than one output wavelength.

For example, the first crystal 502 may double the frequency of 1.04 micron to 1.08 micron wavelength input radiation 501 to produce second harmonic radiation 503 having a vacuum wavelength of about 520 nm to about 540 nm. The second non-linear crystal 504 sums the second harmonic radiation 503 with the remaining portion of the input radiation 501' to produce third harmonic radiation 505 having a vacuum wavelength ranging from about 340 nm to about 360 nm. By way of example, and without loss of generality, the first crystal 502 may double 1.064-micron input radiation 501 to generate 532 nm second-harmonic radiation 503. The second crystal sums the remaining portion of the input radiation 501' with the second-harmonic radiation 503 to produce 355 nm third-harmonic radiation 505. It is noted that although FIG. 5 depicts an example of a third-harmonic generator, those of skill in the art will recognize that other non-linear wavelength converters, such as second-harmonic generators, fourth harmonic generators, other higher harmonic generators, sum-frequency generators, difference-frequency generators, optical parametric oscillators, optical parametric amplifiers, and the like. For example the wavelength converter 500 may be configured as a second harmonic generator if the second non-linear crystal 504 is omitted.

Figure 6A:
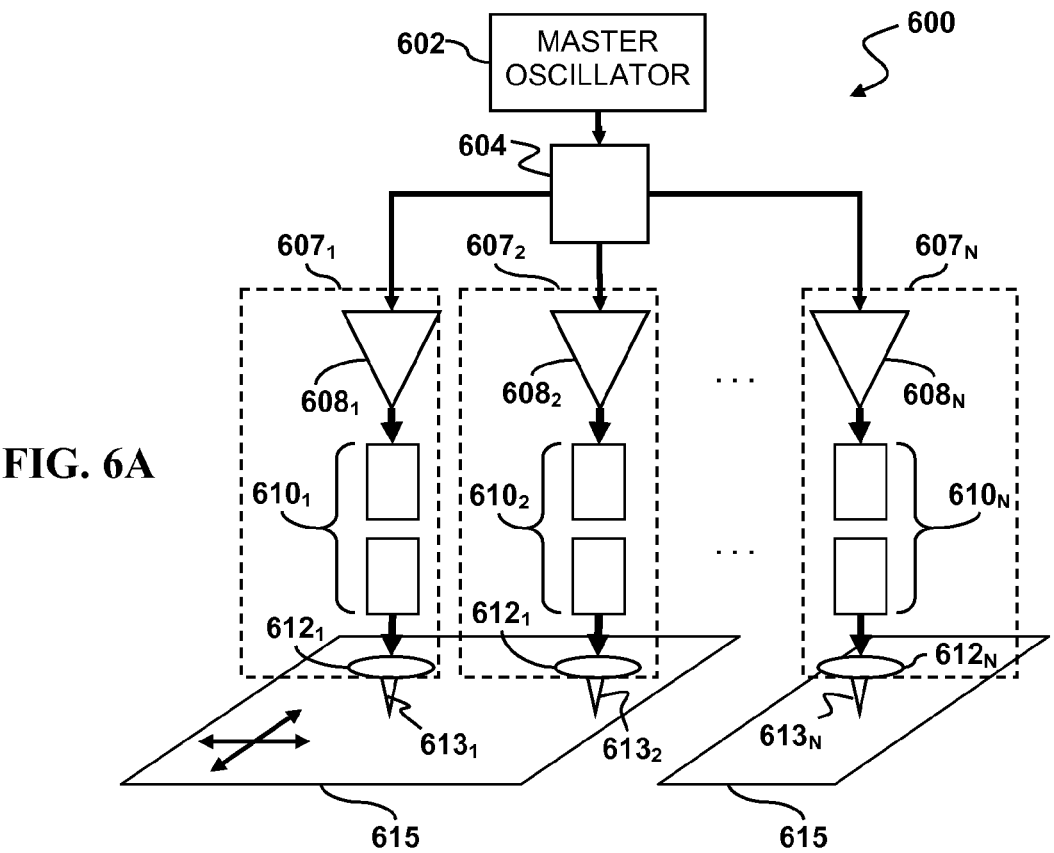
FIGS. 6A-6B are schematic diagrams of laser apparatus adapted for parallel laser machining according to embodiments of the present invention.
Figure 6B:
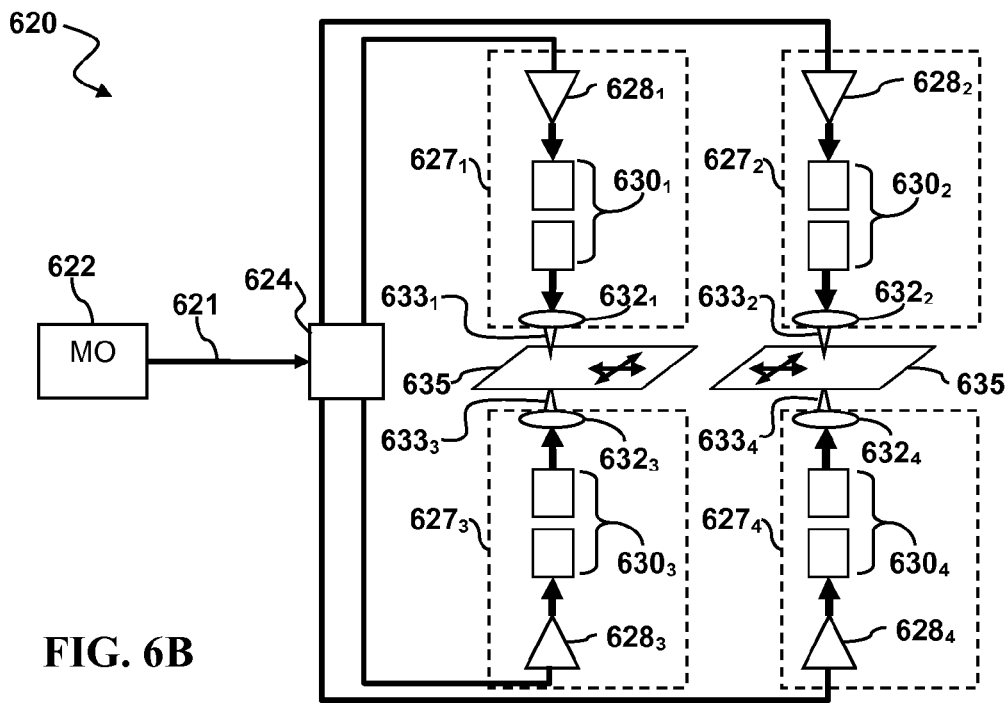

Embodiments of the present invention have a number of practical applications. For example, as shown in FIGS. 6A-6B laser systems having multiple amplified and Wavelength-converted outputs generated from a single master oscillator signal may find application in laser material processing systems. As shown in FIG. 6A, a laser material processing system 600 may include a master oscillator 602 optically coupled by a beam splitter 604 to N optical power amplifiers $608_1, 608_2 \ldots 608_N$. Each of the N optical power amplifiers $608_1, 608_2 \ldots 608_N$ may be optically coupled to a corresponding one of N optical wavelength converters $610_1, 610_2 \ldots 610_N$. Output coupler lenses $612_1, 612_2 \ldots 612_N$ may couple amplified and wavelength-converted outputs $613_1, 613_2, 613_3 \ldots 613_N$ from the optical wavelength converters $610_1, 610_2 \ldots 610_N$, respectively to a single target 615 in parallel. Alternatively, the wavelength-converted amplified outputs may be coupled to different targets 615. The targets 615 may move relative to the output couplers $612_1, 612_2 \ldots 612_N$ to allow for machining of different portions of the workpiece, e.g., by drilling multiple parallel rows of holes or by milling multiple parallel slots or grooves. Such a parallel processing configuration can enhance the processing throughput of workpieces, thereby speeding up production and lower costs.

The system 600 in FIG. 6A is configured to process a single side of one or more targets with multiple amplified wavelength-converted outputs. Alternatively, as shown in FIG. 6B, a laser material processing system 620 may be configured to process two or more different locations on the same or different targets simultaneously. Specifically, in the system 620 a master signal 621 from a master oscillator 622 is split into two branches by a beam splitter 624. One branch of the master signal 621 is coupled to amplifiers $628_1, 628_2$, wavelength converters $630_1, 630_2$ and output couplers $632_1, 632_2$ that couple outputs $633_1, 633_2$ to one side of targets target 635. A second branch of the master signal 621 is coupled to amplifiers $628_3, 628_4$, wavelength converters $630_3, 630_{24}$ and output couplers $632_3, 632_4$ that couple outputs $633_3, 633_4$ to another side of the targets 635. Such a configuration allows for simultaneous processing of opposite sides of the targets 635. Those of skill in the art will recognize that this configuration may be extended to simultaneously processing any number of different sides of a target with any number of amplified and wavelength-converted optical outputs.

Embodiments of the present invention can provide significant advantages in cost and scalability of multiple output wavelength-converted laser systems. Tying multiple amplifiers to the same master oscillator means that each output/power amplifier (and associated wavelength-conversion stage, if appropriate) can operate at its optimal power level, while still enabling arbitrary increase in system output power. Such a configuration also minimizes variation in pulse characteristics so that processes can be more easily replicated amplifier-to-amplifier. Each amplifier can be run at maximum power. There is no need to split one amplified laser output among multiple operations with resulting loss of power.

Cost savings with embodiments of the present invention are potentially significant because in MOPA laser systems, much of the cost, much of the complexity and much of the functionality is embedded in the Master Oscillator. In embodiments of the present invention, by contrast, the incremental cost associated with making the MOPA feed multiple output heads is small, as compared with the cost of duplicating the master oscillator. Furthermore, embodiments of the present invention allow for the number of output heads to be increased in an ad-hoc manner, meaning gradually over time as increased power or throughput is required. Hence, additional system cost is not incurred until additional output power or throughput is required.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An apparatus, comprising:
   a master oscillator;
   a beam splitter coupled to the master oscillator, the beam splitter being adapted to divide a beam of light from the master oscillator into two or more sub-signals;
   two or more output heads optically coupled in parallel to the beam splitter such that each output head receives one of the two or more sub-signals, wherein each of the two or more output heads includes coupling optics optically coupled to the beam splitter, the coupling optics being configured such that optical outputs from the two or more output heads do not spatially overlap at a target; and one or more optical power amplifiers optically coupled between the beam splitter and the coupling optics.

2. The apparatus of claim 1 wherein the one or more of the optical power amplifiers are located in the two or more output heads.

3. The apparatus of claim 2 wherein the optical power amplifier includes an amplifier fiber.

4. The apparatus of claim 2 wherein a pump source for the optical power amplifier is located outside the output head and optically coupled to the output head by a multimode optical fiber.

5. The apparatus of claim 2 wherein each of the two or more output heads includes an optical pre-amplifier optically coupled between the beam splitter and the power amplifier.

6. The apparatus of claim 1 wherein the one or more optical power amplifiers includes an amplifier fiber optically coupled between the beam splitter and an output head.

7. The apparatus of claim 1 wherein an effective peak power for the apparatus exceeds a maximum peak power that the amplifier could generate without fiber nonlinearity problems, undesirable distortions, or damage to one or more of the output heads.

8. The apparatus of claim 1 wherein a total output power for the apparatus is greater than about 10 watts.

9. The apparatus of claim 1 wherein the optical power amplifier is a fiber amplifier.

10. The apparatus of claim 1, further comprising an optical pre-amplifier optically coupled between the master oscillator and the one or more power amplifiers.

11. The apparatus of claim 10 wherein the optical pre-amplifier includes two or more optical pre-amplifiers coupled in series.

12. The apparatus of claim 10, wherein the optical pre-amplifier is optically coupled between the master oscillator and the beam splitter, the apparatus further comprising two or more additional optical pre-amplifiers, each additional optical pre-amplifier being optically coupled between the beam splitter and the power amplifiers.

13. The apparatus of claim 12, further comprising one or more additional beam splitters, wherein each additional beam splitter is optically coupled to an output of one of the output optical pre-amplifiers.

14. The apparatus of claim 1 wherein the there are two or more beam splitters and two or more preamplifiers arranged in branching network between the master oscillator and the one or more power amplifiers.

15. The apparatus of claim 1 wherein the master oscillator includes a modulator configured to pulse an optical output of the master oscillator, whereby optical outputs of the two or more output heads are pulsed and substantially synchronous with each other.

16. The apparatus of claim 1, wherein each of the two or more output heads includes an optical wavelength converter optically coupled to wavelength convert an output of the optical power amplifier.

17. The apparatus of claim 16 wherein the output heads are configured to produce output radiation of different vacuum wavelengths.

18. The apparatus of claim 16, wherein optical wavelength converter is a higher harmonic generator, sum frequency generator, difference-frequency generator, optical parametric oscillator, or optical parametric amplifier.

19. The apparatus of claim 16 wherein the optical wavelength converter is a second harmonic generator, a third harmonic generator or a fourth harmonic generator.

20. The apparatus of claim 16 wherein the optical wavelength converter is a third harmonic generator, whereby an optical output of the third harmonic generators is characterized by a vacuum wavelength of about 340 nanometers to about 360 nanometers.

21. The apparatus of claim 16 wherein the optical wavelength converter is a second harmonic generator, whereby an optical output of the second harmonic generators is characterized by a vacuum wavelength of about 520 nanometers to about 540 nanometers.

22. The apparatus of claim 16 wherein a peak power per output head is optimized for non-linear optics and avoiding undesirable nonlinearities.

23. The apparatus of claim 22 wherein a peak power per head is less than a threshold for undesirable nonlinearities and sufficient to provide a wavelength conversion efficiency greater than about 20%.

24. The apparatus of claim 1 wherein the master oscillator includes ytterbium-doped gain medium configured such that the beam of light from the master oscillator is characterized by a vacuum wavelength of about 1.03 to about 1.12 microns.

25. The apparatus of claim 1 wherein the master oscillator comprises a distributed Bragg reflector (DBR) laser, a distributed feedback (DFB) laser, a fiber laser or a narrow band amplified spontaneous emission (ASE) source.

26. The apparatus of claim 1 wherein the master oscillator includes an external modulator.

27. The apparatus of claim 1 wherein the master oscillator produces a master optical signal characterized by a vacuum wavelength between about 500 nm and about 2000 nm.

28. The apparatus of claim 1 wherein the one or more output heads include an optical pulse stretching or pulse compressing mechanism optically coupled to the optical power amplifier.

29. The apparatus of claim 1 wherein the two or more output heads are configured to deliver amplified output radiation in parallel to two or more sides on the target.

30. The apparatus of claim 1 wherein the two or more output heads are configured to synchronously deliver amplified output radiation in parallel to two or more different targets.

31. The apparatus of claim 1 wherein the coupling optics include means to affect the temporal characteristics of the output beam.

32. A method for producing multiple optical outputs, comprising:
    generating a master optical signal;
    splitting the master optical signal into two or more sub-signals, wherein each sub-signal is directed along a separate optical path;
    amplifying each of the two or more sub-signals to produce two or more amplified outputs; and
    directing the amplified outputs to a target such that the amplified outputs do not spatially overlap at the target.

33. The method of claim 32, further comprising pre-amplifying the master optical signal before splitting the master optical signal into two or more sub-signals.

34. The method of claim 32, further comprising pre-amplifying each of the two or more sub-signals prior to amplifying each of the two or more sub-signals and after splitting the master optical signal into two or more sub-signals.

35. The method of claim 32, further comprising optically coupling the two or more amplified outputs to different sides on one or more targets.

36. The method of claim 32, further comprising wavelength-converting the two or more amplified outputs to produce two or more wavelength-converted amplified outputs.

37. The method of claim 36 wherein the two or more wavelength-converted outputs includes a third harmonic output.

38. The method of claim 36 wherein the two or more wavelength-converted outputs includes a second harmonic output.

39. The method of claim 36 wherein the two or more amplified outputs are characterized by two or more different vacuum wavelengths.

40. The method of claim 32, further comprising selectively pulse picking the two or more amplified outputs to achieve an arbitrary combination of amplified outputs.

41. The method of claim 32, further comprising stretching or compressing a pulse width of the one or more amplified outputs.

42. The method of claim 32, wherein the target is a metal, ceramic, semiconductor, polymer, composite, thin film, wire, organic material, in vitro or in vivo biological sample, or elementary particles.

43. The method of claim 32 wherein the target comprises a printed circuit (PC) board, an integrated circuit (IC) package, a semiconductor wafer or a semiconductor die, a light emitting diode (LED) wafer, a LED package, LED die or a wire.

44. The method of claim 32 wherein performing material processing of the target comprises performing surface texturing, heat treatment, surface engraving, fine micro-machining, surface ablation, cutting, grooving, bump forming, coating, soldering, brazing, sintering, sealing, stereolithography, maskless lithography, link blowing, wafer scribing, dicing, and marking; via drilling; memory repair; flat panel display repair; welding, surface diffusion or surface conversion to a compound.

45. The method of claim 32 wherein performing material processing of the target comprises optimizing a pulse repetition frequency and/or pulse width of the amplified outputs for a materials processing application.

46. The method of claim 32 wherein directing the amplified outputs to a target such that the amplified outputs do not spatially overlap at the target includes performing material processing of the target includes synchronously processing multiple targets with the amplified outputs.

47. The method of claim 32, wherein directing the amplified outputs to a target such that the amplified outputs do not spatially overlap at the target comprises performing wafer inspection, medical treatment or laser particle acceleration.

48. An apparatus, comprising:
a master oscillator;
a beam splitter coupled to the master oscillator, the beam splitter being adapted to divide a beam of light from the master oscillator into two or more sub-signals;
two or more output heads optically coupled in parallel to the beam splitter such that each output head receives one of the two or more sub-signals; and
one or more optical power amplifiers optically coupled between the beam splitter and the coupling optics,
wherein the master oscillator includes a modulator configured to pulse an optical output of the master oscillator, whereby optical outputs of the two or more output heads are pulsed and substantially synchronous with each other.

* * * * *